Figure 1:
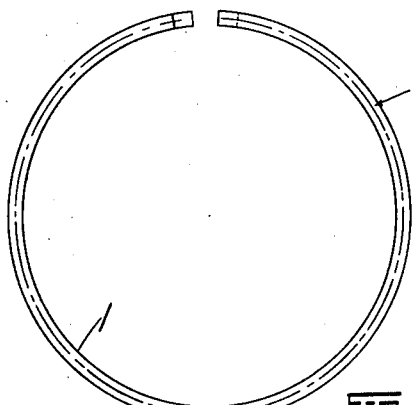

A. J. MUMMERT.
METHOD OF MANUFACTURING PISTON RINGS.
APPLICATION FILED OCT. 10, 1918.

1,314,534.

Patented Sept. 2, 1919.
2 SHEETS—SHEET 1.

WITNESSES:
Harry A. Bein
Jos. Amichel

INVENTOR.
Arden J. Mummert.
BY Emil Starek
ATTORNEY.

A. J. MUMMERT.
METHOD OF MANUFACTURING PISTON RINGS.
APPLICATION FILED OCT. 10, 1918.

1,314,534. Patented Sept. 2, 1919.
2 SHEETS—SHEET 2.

WITNESSES:
Harry A. Beimel
Josamichef

INVENTOR.
Arden J. Mummert.
BY Emil Starek
ATTORNEY.

UNITED STATES PATENT OFFICE.

ARDEN J. MUMMERT, OF ST. LOUIS, MISSOURI, ASSIGNOR TO McQUAY-NORRIS MANUFACTURING COMPANY, OF ST. LOUIS, MISSOURI, A CORPORATION OF MISSOURI.

METHOD OF MANUFACTURING PISTON-RINGS.

1,314,534.        Specification of Letters Patent.        Patented Sept. 2, 1919.

Original application filed February 5, 1918, Serial No. 215,469. Divided and this application filed October 10, 1918. Serial No. 257,642.

*To all whom it may concern:*

Be it known that I, ARDEN J. MUMMERT, a citizen of the United States, residing at St. Louis, State of Missouri, have invented certain new and useful Improvements in Methods of Manufacturing Piston-Rings, of which the following is a full, clear, and exact description, reference being had to the accompanying drawings, forming a part hereof.

The present is a division of my pending application for improvements in the manufacture of packing rings for pistons, Serial Number 215,469, filed February 5, 1918, being specifically directed to the method involved in the manufacture of the ring. The ultimate object sought is to produce a packing ring of substantially uniform cross-section which, when inserted into the cylinder in which it is intended to operate will not only conform to the circular cross-section of the cylinder but will engage the walls thereof with uniform pressure throughout its entire circumference. In other words, the object sought is to produce a split packing ring which shall be truly circular while in service and which shall exert at all points uniform radial pressure against the walls of the cylinder in which the same is confined. In this type of ring the contact with the cylinder walls is brought about by the outward spring of the metal of which the ring is composed, the radial pressure exerted against said walls depending on the shape of the ring when free (or out of the cylinder), on the cross-section of the ring, and on the resilience of the metal (or other material) from which the ring is made. The circumferential dimension of the ring should be sufficient to permit the ring when placed on its piston and deposited in the cylinder, to expand into or assume the form of an annular or circular body whose outer face or periphery shall contact at all points with, and exert equal radial pressure against, the walls of the cylinder. Rings of this character being usually cast, it necessarily follows that the resilience of the metal can be availed of only by splitting or parting the ring and thereby leaving a gap which will permit of sufficient contraction in the ring to impose on the metal the necessary tension under which it tends to resume its original expanded position, this tension being the force which acts radially upon the walls of the cylinder when the contracted ring is inserted thereinto. My invention is specially concerned with the stage at which the gap is formed in the blank from which the ring is directly made, and with the manner of forming the blank. As ordinarily constructed, a packing ring is made by cutting a circular blank or ring of iron of proper width and thickness from a tube casting, the outside diameter of the ring exceeding the diameter of the cylinder bore designed to receive it. This excess in diameter (by way of example) is approximately one thirty-second of an inch for every inch of diameter of the cylinder bore, so that if the diameter of the bore is four inches, the outside diameter of the ring would be four and four-thirty-seconds inches. The rule for the thickness of the ring is also one thirty-second of an inch thickness for each inch of diameter of bore, a cylinder four inches in diameter requiring a ring four-thirty-seconds of an inch in thickness. From this oversize circular blank there is cut a segment, thereby leaving a gap which permits the ring to be contracted or compressed and inserted into the cylinder, the inherent resilience, and tendency of the ring to resume its original dimensions or free state and contour, exerting the necessary radial pressure against the walls of the cylinder, forming a joint therewith, and preventing the escape of any fluid that is to be held by the piston. A ring made in the manner outlined above does not contact with the walls of the cylinder to the same degree at all points, owing to the distortion of the ring from a true circular form when contracted; and in practice the portions of the ring contiguous to the ends on each side of the gap are more or less out of contact so as to leave a clearance between the ring and cylinder walls and permit the gases or fluid to escape therethrough. In this type of ring the greatest radial pressure will be found at the ends and at the mid section, the poorer contact and hence the less pressure being confined to the sections ninety (90) degrees from either of the points of maximum pressure referred to. It is therefore apparent that a piston ring to operate with uniform pressure in the cylinder must not be a perfect circle when free, and conversely if the proper initial curvature be imparted to the ring when free and not contracted or compressed, it will show a uniform pressure per square inch at every point of contact with the cylinder walls, when contracted. In the defective type of ring above alluded to, the error is often corrected by lapping or scraping the outer face of the ring so as to present a more uniform pressure throughout its entire periphery; but this practice consumes time and labor and is for that reason objectionable. In the early stages of development of my present improvement I succeeded in securing uniform radial pressure throughout the entire circumference of a ring by bending a split circular ring at different sections from a very heavy curve at the ends to a very light one at the mid section. The general outline of the ring when free was no longer a true circle, but followed a curve taken from a templet. The templet curve was derived by calculating the stresses at different sections of a hypothetical ring which was assumed to exert the same radial pressure per square inch at all points against the cylinder walls. It was found that these stresses decreased uniformly from the mid section to the ends of the ring, the curve being calculated to so vary the radii at different sections of the ring as to produce a ring which when free was not a true circle. Such a ring when compressed would produce the proper stress relations at different sections so as to exert substantially uniform radial pressure against the cylinder walls along its entire circumference. To bend each ring individually however consumes time and labor, to eliminate which is one of the objects of my present improvement. I avail myself of the curvature of the templet based on the stress calculations of the hypothetical ring aforesaid, but in lieu of imparting this curvature to each individual split circular ring by the bending and straining process above referred to, I provide a suitable pattern from which is cast the blank from which the finished piston ring is directly made. The method by which the pattern for this blank is obtained, as well as the resulting blank and finished ring I consider to be new. The advantages of the invention will be fully apparent from the following detailed description in connection with the accompanying drawings in which—

Figure 2:
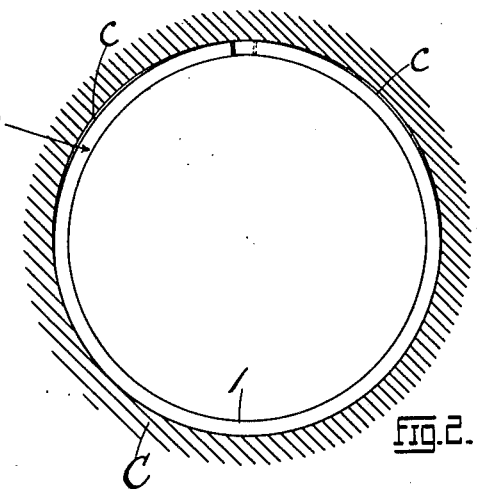
Figure 3:
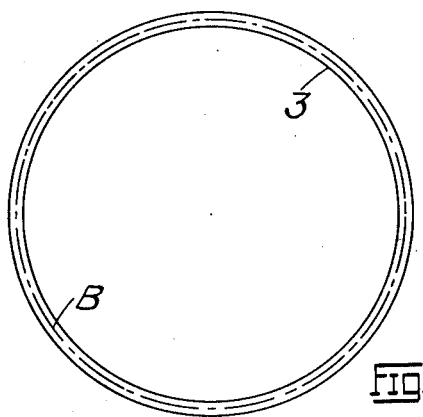
Figure 4:
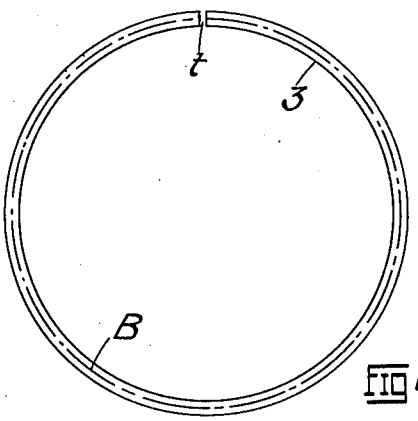
Figure 5:
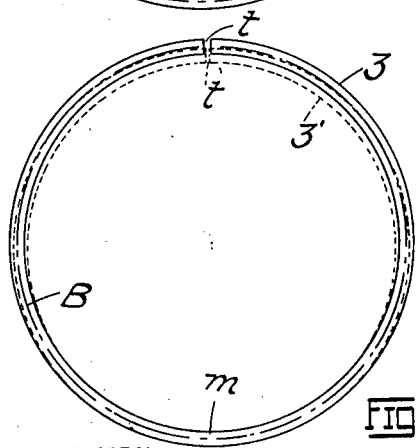
Figure 6:
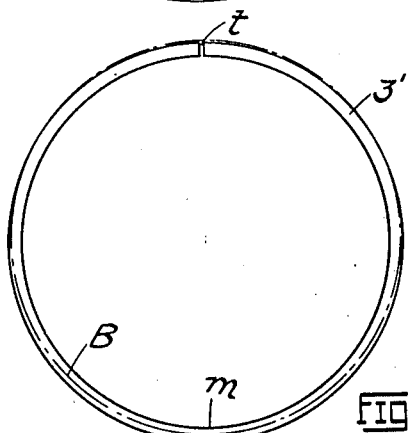
Figure 7:
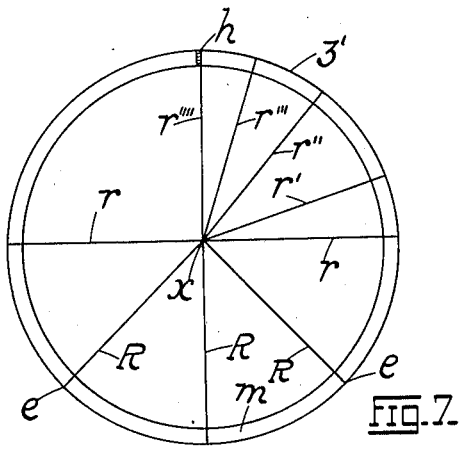
Figure 8:
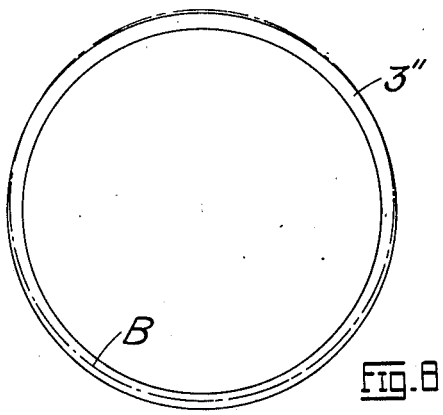
Figure 9:
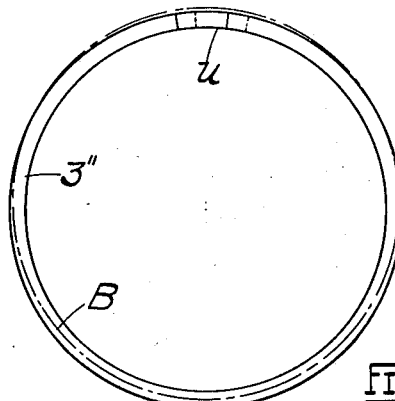
Figure 10:
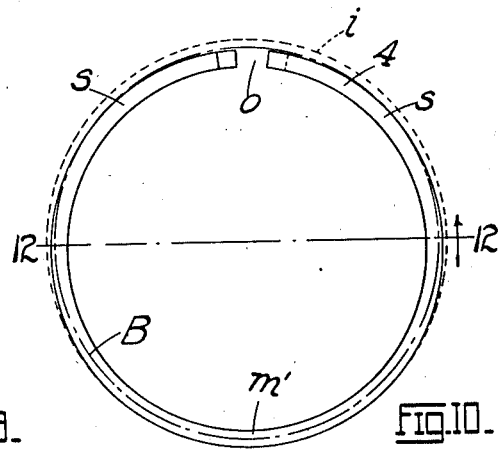
Figure 11:
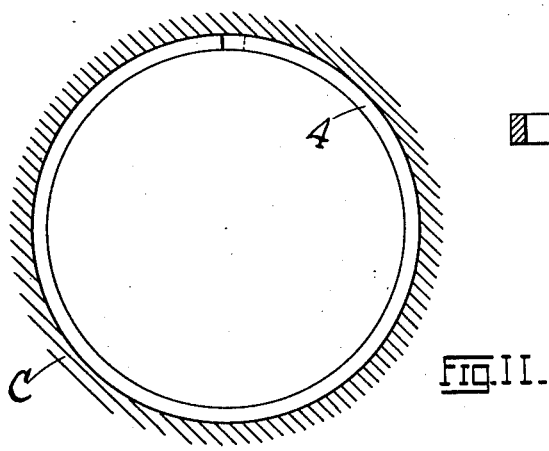
Figure 12:
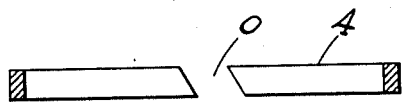

Figure 1 represents a plan of a conventional circular ring from which a segment has been removed to permit the same to be contracted for insertion into a cylinder, the bore line of the cylinder being shown dotted; Fig. 2 is a plan of the contracted ring confined in the cylinder the latter being shown in cross-section, said view showing the clearance between the cylinder walls and the outer face of the ring on either side of the ends of the ring; Fig. 3 is a plan of the closed pattern ring employed at the initial stage of my method, said ring exceeding in outside diameter the diameter of the cylinder bore designed to receive it, the bore being shown dotted; Fig. 4 is a plan of the same ring showing the initial saw slot or cut therein, the cylinder bore being dotted; Fig. 5 is a plan of the slit ring shown superposed over the circle defining the bore of the cylinder, the dotted lines representing the deflection to which the ends of the ring are subjected and the distortion from a true circle suffered by the ring in consequence; Fig. 6 is a plan of the distorted ring with the bore line shown dotted; Fig. 7 is a plan of the distorted ring with the saw slot or cut closed by a suitable filler and serving as a pattern; Fig. 8 is a plan of the ring blank cast from said pattern; Fig. 9 is a plan of the ring blank showing the section which is to be cut out and removed to produce the final free or open ring; Fig. 10 is a plan of the completed ring when free and not restrained; Fig. 11 is a plan of the ring shown contracted and confined in the cylinder; and Fig. 12 is a cross-section on the line 12—12 of Fig. 10.

Referring for the moment to Figs. 1 and 2, in which the open ordinary circular ring is represented by the numeral 1 and the cylinder by C, it will be observed that when the ring is contracted and inserted in the cylinder, it becomes distorted from a true circle, the portions between the ends and points substantially ninety degrees therefrom failing to follow the curvature of the cross-section of the cylinder, but departing therefrom sufficiently to leave clearances $c$ between the ring and cylinder walls, through which the fluid may leak thereby destroying the efficacy of the ring as a packing. By my method a ring of uniform cross-section when finished assumes a truly circular form, exerting a uniform radial pressure against the cylinder walls throughout and being practically proof against leakage.

Referring now to Figs. 3 to 12 inclusive, 3 represents the original pattern ring as cut from an iron tube casting, the outer diameter of which exceeds that of the cylinder bore B as previously pointed out. The next step in the operation is to cut a slit $t$ across the ring with a fine saw thereby splitting or parting the ring as shown. The portions of the ring on each side of the slit are next bent into non-circular form by forcing the same inwardly or radially toward the center of the ring, the free ends thereof under the bending operation being displaced or forced from their original position a distance which, though necessarily varying with the character of the material used, in the present example amounts to substantially one-half the thickness of the ring, this bending action operating to distort the ring into a form or pattern 3' shown by the dotted lines in Fig. 5, and as shown in Figs. 6 and 7. The displacement and distortion are effected in any mechanical manner, but preferably by a machine which gradually strains or bends each section of the ring from the mid section $m$ (the portion diametrically opposite the slit $t$) to the ends of the ring. The greatest bending is produced in the portions or sections of the ring nearest the ends, the bending or displacement decreasing as we approach the mid section. Thus, assuming (Fig. 7) the point $x$ to represent the geometric center of the ring before distortion, it will be seen that the curvatures of the outer faces of the distorted portions follow, or are defined by, the outer terminals of radii vectors $r$, $r'$, $r''$, $r'''$, $r''''$, progressively decreasing in length from the ends $e$, $e$, of the mid section $m$, the outside radius of curvature R of which corresponds substantially to the radius of curvature of the outer face of the ring 3 before distortion. The slit $t$ in the pattern 3' is preferably (though not necessarily) closed by a filler $h$ of wax, solder, copper or other material as shown in Fig. 7, the presence of the filler insuring a more rigid pattern. With this distorted ring 3' as a pattern I cast the ring-blank 3'' as shown in Fig. 8. From the blank thus formed I remove a small segment $u$ in the region of maximum displacement, said segment extending on each side of the shortest radius vector $r''''$, and corresponding in length substantially to six times the radial displacement of the free ends of the slit ring 3, that is to say, the length of the segment removed is in the ratio of the circumference to the radius along which the displacement was made. By removing the segment $u$ we finally obtain an open ring 4 with a gap $o$ as shown in Fig. 10, such a ring when contracted (and finished) and inserted in the cylinder C contacting with the cylinder walls and exerting even pressure against said walls throughout its entire periphery and making a tight joint with said walls.

In the present example, the distortion suffered by the slit ring 3 under the bending operation resulted in a radial displacement of the terminals of the ring of substantially one-half the thickness of the ring; the length of the segment $u$ removed from the distorted ring blank 3'' was equal substantially to six times this radial displacement; the thickness of the ring was given as corresponding substantially to one thirty-second of an inch for each inch diameter of the cylinder bore; the excess of the outside diameter of the original or pattern ring 3 over the diameter of the cylinder was given as one thirty-second of an inch for each inch diameter of the cylinder. These various dimensions and relations, it is to be understood are here given by way of example because frequently occurring in practice; but the same may be departed from by those skilled in the art according to the conditions to be met. Much depends on the molecular structure of the metal from which the ring blank 3'' is cast; much on the limit of elasticity of the metal; much on the cross-sectional area of the ring; on the resilience of the metal, and on other considerations to be taken into account as they present themselves to the skilled mechanic.

The outside radius of curvature R of the mid section $m$ of the pattern 3' corresponds substantially to the radius of curvature of the outer face of the ring 3 before distortion, that is to say, it is a radius larger than the radius of curvature of the bore B of the cylinder in which the ring is to operate. This radius of curvature progressively diminishes from the mid-section $m$ to a point diametrically opposite the center of said section as apparent from the progressively diminishing radii vectors $r$, $r'$, $r''$, $r'''$, $r''''$, the shortest radius vector $r''''$ terminating at the outside of the slit $t$ or the filler $h$ closing the same, as shown. The shortest radius vector $r''''$ should preferably be a shade less than the radius of curvature of the bore of the cylinder, thereby leaving the radii vectors which lead to the points corresponding to the ends of the outer curve of the segment $u$ removed from the blank 3'' substantially equal to the radius of curvature of the cylinder bore. We thus produce a pattern (Figs. 6, 7,) having on one side a portion or mid section $m$ whose outside radius of curvature is in excess of the radius of curvature of the bore of the cylinder in which the ring is to operate, the radii (vectors) decreasing in both directions from said mid section until they attain a length substantially equal to the radius of curvature of the cylinder bore at points corresponding to the ends of the outer curve of the segment $u$ removed from the blank 3'' cast from said pattern. As previously stated such a pattern and method of producing the same, as well as the ring blank (3'') cast therefrom and the finished ring (4) I consider to be new.

It will be seen from Fig. 5 in which the cylinder bore is represented by the dotted line B, that the radial displacement of the ends of the ring 3 in the process of distortion to form the pattern 3' is sufficient to bring the outer faces of said ends just inside the circle of the bore. From this point the distortion is gradually less until the mid section of the ring 3 is reached where it practically disappears. I do not of course wish to be limited to the precise degree of distortion here shown, any equivalent distortion which will result in a pattern from which a ring blank such as 3″ can be cast and a finished piston ring such as 4 can be obtained falling within the spirit of my invention. It was stated at the outset that a piston ring exerting uniform radial pressure against the cylinder walls throughout its entire circumference may be formed by the proper bending and distortion of an original split circular ring, the curvature of the distorted ring being taken from a templet. Such a ring may approach or actually conform to the curvature of the cast ring 4 under my present invention, but besides being open to the objections heretofore pointed out (the consumption of time and labor) it is open to the further objection that its fibers and molecules have been strained in the distorting process, this straining in a measure detracting from the elasticity and resilience of the ring. By my present method I secure a ring 4 of proper contour by casting; and since its molecules have not been disturbed by distortion and bending to bring it into the desired shape, it follows that its elasticity and resilience have not in any wise been impaired or affected. Such a ring (see Fig. 10) comprises a mid section $m'$ whose outer radius of curvature is in excess of the radius of curvature of the bore of the cylinder in which the ring is to operate, conforming in the main to that of the original pattern ring 3, and non-circular side sections $s, s$, whose outer curvatures follow the terminals of radii vectors progressively diminishing in length from said mid section toward the gap $o$ at which gap they correspond substantially to the radius of curvature of the cylinder bore. These curvatures are eccentric and interior to the outer circle $i$ representing the curvature of the outer face of the original pattern ring 3, and in the main exterior and eccentric to the bore line B. It is to be understood that I do not wish to be limited to the precise relation in the lengths between the radius of the cylinder bore and the shortest radius vector defining the maximum displacement of the ring terminals. A ring in which the shortest radius vector exceeded in length the radius of the cylinder bore would likewise fall within the spirit of my invention. The gap $o$ of course is sufficient to permit the ring to be contracted to a perfectly circular form and to a dimension to permit insertion of the contracted ring into the cylinder C having the bore B. It may be stated in passing that the curve imparted to the slit ring 3 to form the pattern 3′ is taken from a templet the curve of which is derived by calculating the stresses at different sections of a hypothetical ring exerting, or assumed to exert, a uniform radial pressure per square inch at all points against the cylinder walls. This templet curve may be imparted to individual split circular piston rings as heretofore described, but as already pointed out this method is laborious, slow, and expensive, and impairs the resilience of the finished ring. It is of course necessary before the ring is put to use that the same be ground or finished to remove surface irregularities so as to obtain a perfectly cylindrical and smooth bearing surface for the ring when inserted into the cylinder. To grind the ring the same is held contracted or compressed in a suitable jig or machine, and while so contracted the same is ground and finished to the proper working conditions. The ring thus finished will be perfectly round and true and exert uniform radial pressure at all points against the walls of the cylinder in which it is to operate. For convenience we may assume the ring 4 to have been ground previous to its insertion into the cylinder C as shown in Fig. 11. The invention need not of course be limited to the production of rings for use in pistons and is not to be understood as restricted thereto. The pattern ring 3 and pattern 3′ may also be made of brass or any other suitable material. If made of metal it may be readily bent to conform to the templet curve employed, and when once conformed to said curve, the same may be used as a pattern even without the use of the filler $h$ closing the saw slot. With the filler $h$ however we secure a somewhat stiffer pattern. It is apparent of course that I may cut out or remove a segment such as $u$ from the pattern 3′ (if made of the proper metal) and secure a piston ring on the order of that herein contemplated, such an alternative falling within the scope of the present invention. But, as pointed out above, this method is not desired in practice involving as it does the individual bending and distortion of each ring, and resulting in a measure in the restraining of the fibers from their original condition and reducing the elasticity of the ring. It may be stated in passing that when a circular ring such as 3 is slit and subjected to the distortion here described, to produce the pattern 3′, the outside radius of curvature R theoretically begins to shorten or decrease in length from a point diametrically opposite the slit $t$, so that at this point only does the radius remain its full original length. Practically however the shortening of the radii is not perceptible until the points $e, e$, are reached, the positions of these points depending of course on the diameter of the ring, the material employed, the cross-section of the ring and like factors not necessary to mention. The length of the inside radius of curvature of the ring is controlled in substantially the same way. It is to be understood therefore that what is herein referred to as the mid-section of the ring, is that portion opposite the slit $t$ or gap $o$ whose outside radius of curvature remains practically constant and substantially of the length of the radius R of the ring before distortion, no fixed length for said mid-section being claimed or urged herein. In bending the slit circular ring 3 shown in Figs. 4 and 5 into the distorted or non-circular form 3' indicated by the dotted lines in Fig. 5, and as shown in Figs. 6 and 7, the slit *t* contracts somewhat, but the amount is so slight that in order to bring it out, the original width of the slit is purposely exaggerated in Figs. 4 and 5, the contraction clearly appearing in the somewhat narrower dotted line slit in Fig. 5, and in the slit of the ring shown in Fig. 6.

Having described my invention what I claim is:

1. In the manufacture of cast piston-rings, the method of making a pattern which consists in forming a cross-cut or slit in a circular ring the outside radius of curvature of which exceeds the radius of curvature of the cylinder in which the piston-ring is to operate, and subjecting the portions adjacent to and on opposite sides of the slit to an inward bending and distortion to bring the free ends of the ring to the outer terminal of a radius vector leading from the geometric center of the original ring and shorter than the outside radius of curvature of said ring.

2. In the manufacture of cast piston-rings, the method of making a pattern which consists in forming a cross-cut or slit in a circular ring the outside radius of curvature of which exceeds the radius of curvature of the cylinder in which the piston-ring is to operate, and subjecting the portions adjacent to and on opposite sides of the slit to an inward bending and distortion to impart thereto a non-circular curvature and bring the free ends of the ring to the outer terminal of a radius vector leading from the geometric center of the original ring and shorter than the outside radius of curvature of said ring.

3. In the manufacture of piston rings, the method consisting in forming a cross cut or slit in a circular pattern ring the outside radius of curvature of which exceeds the radius of curvature of the cylinder in which the piston ring is to operate, subjecting the slit ring to inward bending and distortion to bring the free ends thereof to the outer terminal of a radius vector leading from the geometric center of the original ring and shorter than the outside radius of curvature of said ring, casting from said bent and distorted ring a suitable ring blank, and removing from said blank a segment extending on either side of the radius vector aforesaid thereby forming an open ring.

4. In the manufacture of piston rings, the method consisting in forming a cross cut or slit in a circular pattern ring the outside radius of curvature of which exceeds the radius of curvature of the cylinder in which the piston ring is to operate, subjecting the slit ring to inward bending and distortion to cause the outer faces of the portions on each side of the slit to assume a non circular curvature formed by the outer terminals of radii vectors progressively decreasing in length from the ends of the mid section of the ring toward the slit aforesaid, then closing the slit in the ring so bent and distorted to form a pattern, casting a ring blank from said pattern, and finally removing a segment from the side of the casting to which lead the shortest radii vectors, thereby forming an open or parted piston ring.

5. In the manufacture of piston rings, the method consisting in forming a cross cut or slit in a circular pattern ring. the outside radius of curvature of which exceeds the radius of curvature of the cylinder in which the piston is to operate, distorting the portions of the ring on either side of the slit into non-circular form by forcing the same inwardly and bringing the free ends of the ring to the outer terminal of a radius vector leading from the geometric center of the original ring and shorter than the outside radius of curvature of said ring, casting from said distorted ring a suitable ring blank, and removing from said blank a segment extending on either side of the radius vector aforesaid, thereby forming an open ring.

In testimony whereof I affix my signature, in presence of two witnesses.

ARDEN J. MUMMERT.

Witnesses:
J. E. LAWTON,
J. H. OEHMANN.